(12) United States Patent
Fallis, III et al.

(10) Patent No.: US 8,382,190 B2
(45) Date of Patent: Feb. 26, 2013

(54) THREE-SECTION RETRACTABLE HARDTOP WITH TELESCOPING SECTION

(75) Inventors: Robert E. Fallis, III, Rochester, MI (US); Michael T. Willard, Harrison Township, MI (US); Robert D. Wiechowski, Warren, MI (US)

(73) Assignee: Magna Car Top Systems GmbH, Troy, MI (US)

( * ) Notice: Subject to any disclaimer, the term of this patent is extended or adjusted under 35 U.S.C. 154(b) by 300 days.

(21) Appl. No.: 12/784,811

(22) Filed: May 21, 2010

(65) Prior Publication Data

US 2010/0301628 A1 Dec. 2, 2010

Related U.S. Application Data

(60) Provisional application No. 61/181,812, filed on May 28, 2009.

(51) Int. Cl.
*B60J 7/00* (2006.01)

(52) U.S. Cl. ............ 296/107.18; 296/107.2; 296/107.07

(58) Field of Classification Search ............. 296/107.07, 296/107.17, 107.18, 107.19, 107.02
See application file for complete search history.

(56) References Cited

U.S. PATENT DOCUMENTS

| | | | |
|---|---|---|---|
| 2,623,779 | A | 12/1952 | Catell |
| 2,632,670 | A | 3/1953 | Crenshaw |
| 2,754,149 | A | 7/1956 | McGrath et al. |
| 3,021,174 | A | 2/1962 | Rund |
| 3,690,722 | A | 9/1972 | Bakewicz et al. |
| 5,429,409 | A | 7/1995 | Corder et al. |
| 5,558,388 | A | 9/1996 | Fürst et al. |
| 5,743,587 | A | 4/1998 | Alexander et al. |
| 5,769,483 | A | 6/1998 | Danzl et al. |
| 6,053,560 | A | 4/2000 | Rothe |
| 6,957,843 | B2 | 10/2005 | Guillez |
| 7,134,708 | B2 | 11/2006 | Russke |
| 7,896,423 | B2 * | 3/2011 | Wiechowski et al. ... 296/107.17 |

* cited by examiner

*Primary Examiner* — Joseph Pape
(74) *Attorney, Agent, or Firm* — Brooks Kushman P.C.

(57) ABSTRACT

A convertible top assembly for a motor vehicle having a seating compartment with front and rear seating areas includes multiple panels with a front panel displaceable over the rear seating panel and at least two panels displaceable to form a stack that is displaced rearwardly of the seating compartment.

17 Claims, 4 Drawing Sheets

THREE-SECTION RETRACTABLE HARDTOP WITH TELESCOPING SECTION

CROSS-REFERENCE TO RELATED APPLICATIONS

This application claims the benefit of U.S. provisional Application No. 61/181,812 filed May 28, 2009. The disclosure of which is incorporated in its entirety by reference herein.

BACKGROUND OF THE INVENTION

1. Field of the Invention

The present invention relates to a retractable hardtop for a vehicle.

2. Background Art

A convertible top may be provided as a retractable hardtop that includes rigid retractable panels. Alternatively, a soft top convertible may be provided that includes a fabric cover over a plurality of bows. Soft top convertibles generally require less space than retractable hardtops because the fabric cover may be compressed when the top is retracted thereby minimizing storage requirements. Retractable hardtops are favored by some consumers because they offer the appearance of a hardtop vehicle and may be perceived to be more durable.

One disadvantage of prior art retractable hardtops is the complexity of the top stack linkage required to extend and retract the retractable hardtop. Another problem associated with retractable hardtop vehicles is that space limitations imposed by vehicle design make it difficult to store rigid panels in the vehicle when retracted. There is a need to reduce the space required in the trunk of a vehicle to store the retractable hardtop when retracted. There is also a need to provide clearance for the retractable hardtop top stack linkage as it is moved through the retraction and extension cycles.

The present invention is directed to solving the problems by providing a simple and effective retractable hardtop that minimizes the space required in the trunk of the vehicle to store the retractable hardtop when it is retracted.

DETAILED DESCRIPTION OF THE PREFERRED EMBODIMENT(S)

Figure 1:
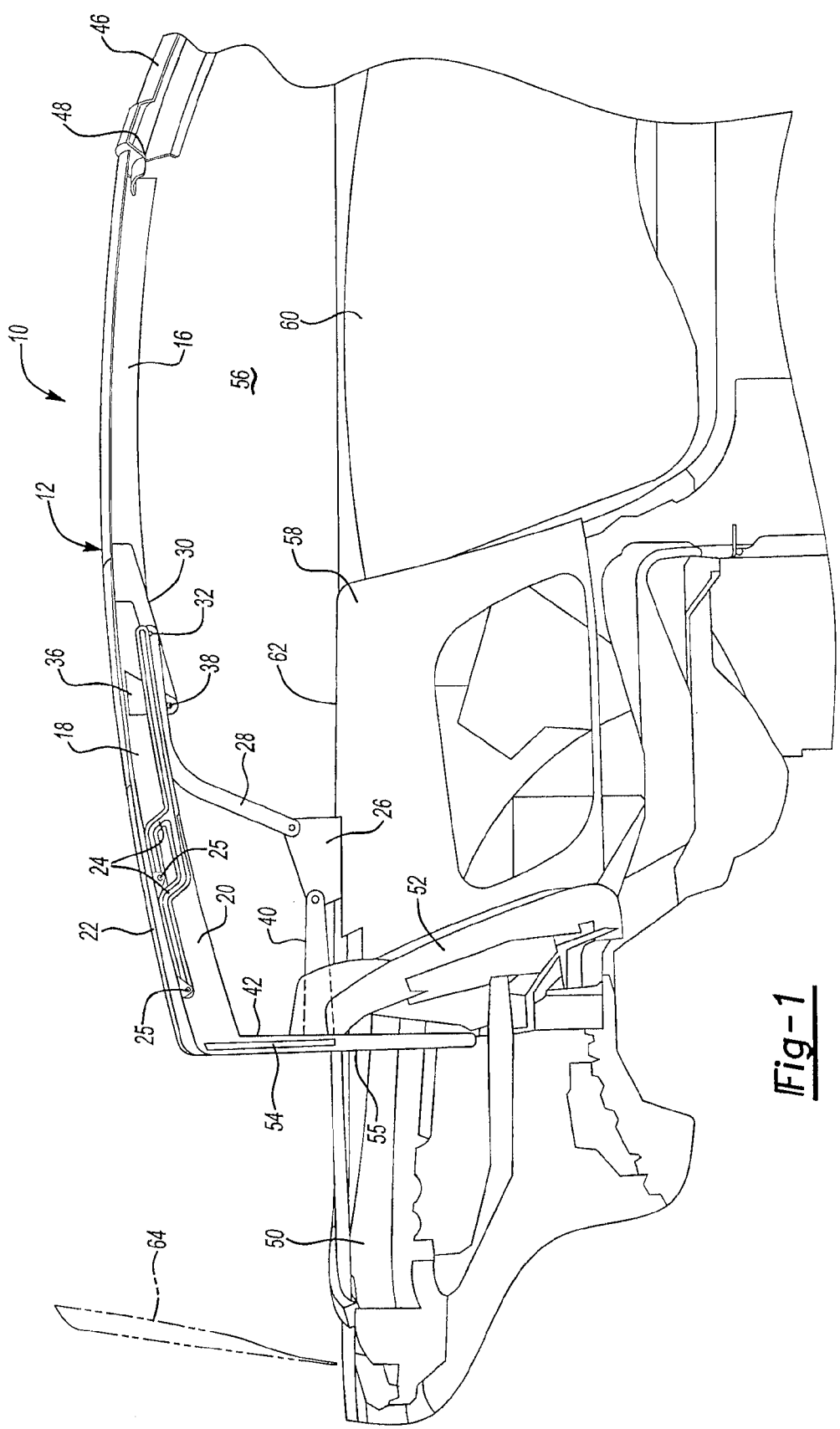
FIG. 1 is a fragmentary diagrammatic side elevation view taken from the inside of the vehicle of one side of the retractable hardtop made according to the present invention in a fully extended position.

Referring to FIG. 1, a vehicle 10 having a retractable hardtop generally indicated by reference numeral 12 is illustrated in a fragmentary view. In FIG. 1, the retractable hardtop 12 is shown in its fully extended position.

The retractable hardtop 12 includes a front panel 16. An intermediate panel 18 is disposed immediately adjacent and behind the front panel 16. A slide guide rail 20 is secured to or integrally formed with the intermediate panel 18. A back panel 22 is disposed immediately behind and adjacent to the intermediate panel 18 and is received by the slide guide rail 20 in a sliding relationship relative to the slide guide rail 20. The slide guide rail 20 defines a guide track 24. Two or more track followers 25 are provided that are received in the guide track 24. The followers 25 guide the movement of the rear panel 22 as it moves relative to the guide rail 20.

Figure 4:
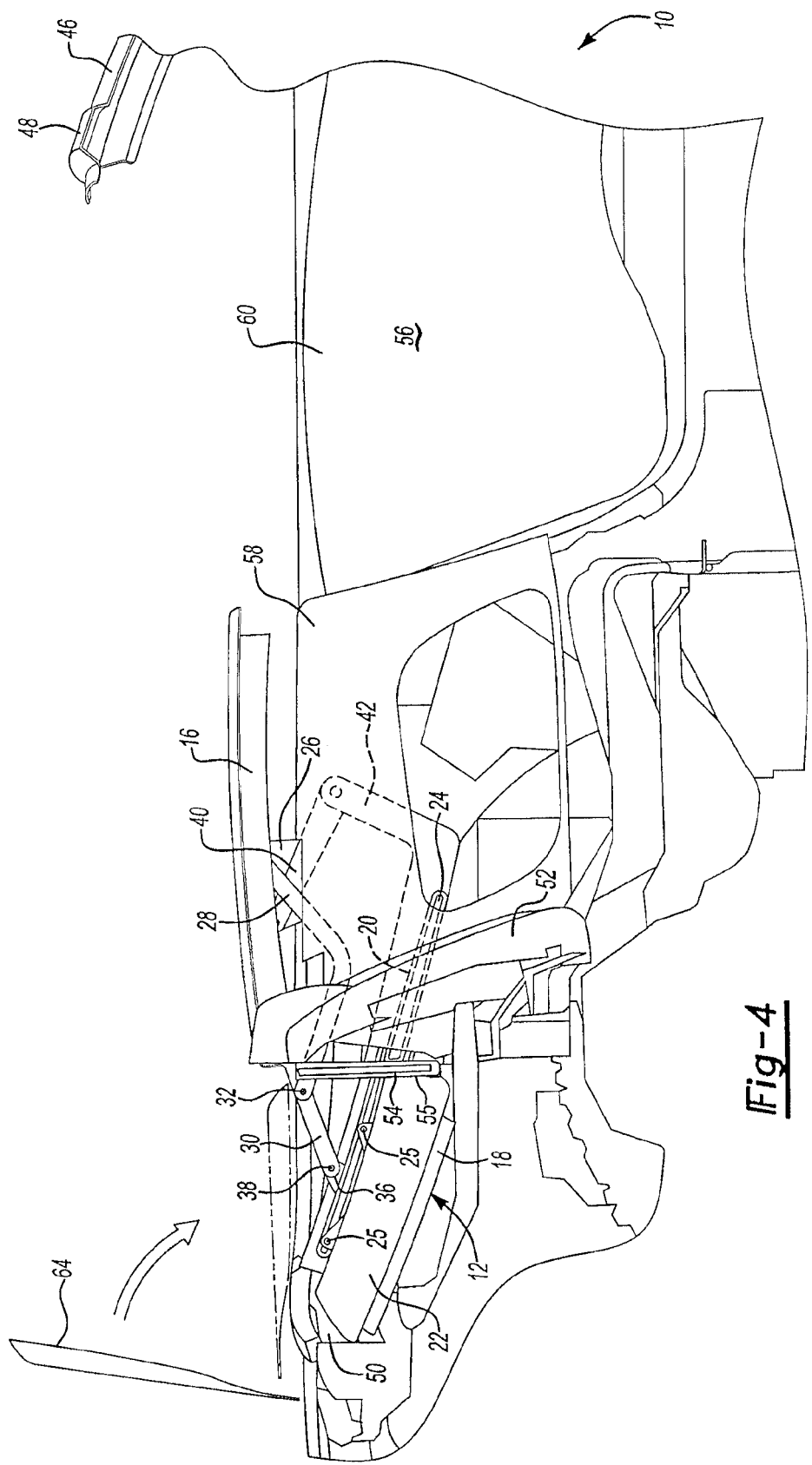
FIG. 4 is a fragmentary diagrammatic side elevation view in the fully retracted position taken from the inside of the vehicle of one side of the retractable hardtop made according to the present invention in the fully retracted position.

A main pivot bracket 26 secures the retractable hardtop 12 to the vehicle 10 and controls movement of the retractable hardtop 12 between its extended position shown in FIG. 1 and a retracted position as shown in FIG. 4. A balance link 28 is connected to the main pivot bracket 26. The balance link 28 is connected to a rear extension link 30 that extends rearwardly from the front panel 16. A pivot connector 32 is provided on the rear extension link 30 to pivotally connect the balance link 28 to the rear extension link 30. A flange 36 is provided on the intermediate panel 18. The flange 36 defines a pivot connector 38 that is pivotally connected to the rear extension link 30. The slide guide rail 20 is formed in a generally J-shaped portion with a rear extension link portion 40 and a vertical extension leg portion 42. The rear extension link portion 40 extends from the main pivot bracket 26 rearwardly to the vertical extension leg portion 42, as viewed in the position shown in FIG. 1. The slide guide rail 20 is rigidly connected to or integrally formed with the rear extension link portion 40 and the vertical extension leg portion 42. The rear extension link portion 40 is pivotally connected to the main pivot bracket 26.

A windshield 46 includes a header 48 to which the front panel 16 is secured in the extended position.

A storage compartment 50 is provided behind the rear seat 52 for storing the retractable hardtop 12 when it is retracted into the body of the vehicle 10. A rear window 54 is extended and retracted into a rear window retractor 55 that is disposed behind the rear seat 52. The rear window 54 may be raised or lowered when the top 12 is in either the fully extended position or the fully retracted position. The rear window 54 is lowered into the window retractor when the top 12 is being extended or retracted to provide clearance to allow the back panel 22 to move to the positions shown, for example, in FIGS. 2 and 3. The rear window 54 may be lowered when the top 12 is extended to provide flow through ventilation. The rear window 54 may be raised after the top 12 is retracted to provide a wind screen when traveling at higher speeds with the top 12 down or if the ambient temperature is relatively cool.

A passenger compartment 56 of the vehicle is laterally defined by a sidewall 58 to which a door 60 is pivotally attached. The balance link 28 is mounted at or near the belt line 62 of the vehicle 10. The main pivot bracket 26 may be attached above the sidewall or below the sidewall depending upon vehicle design requirements. A pivotal tonneau 64 shown in phantom lines in FIG. 1 in its raised position in which access to the storage compartment 50 is provided.

The balance link 28, rear extension link portion 40 and vertical extension leg portion 42 pivot through the sidewall 58 in a clearance slot formed in the sidewall that extends through the belt line 62, as is well known in the art.

Figure 2:
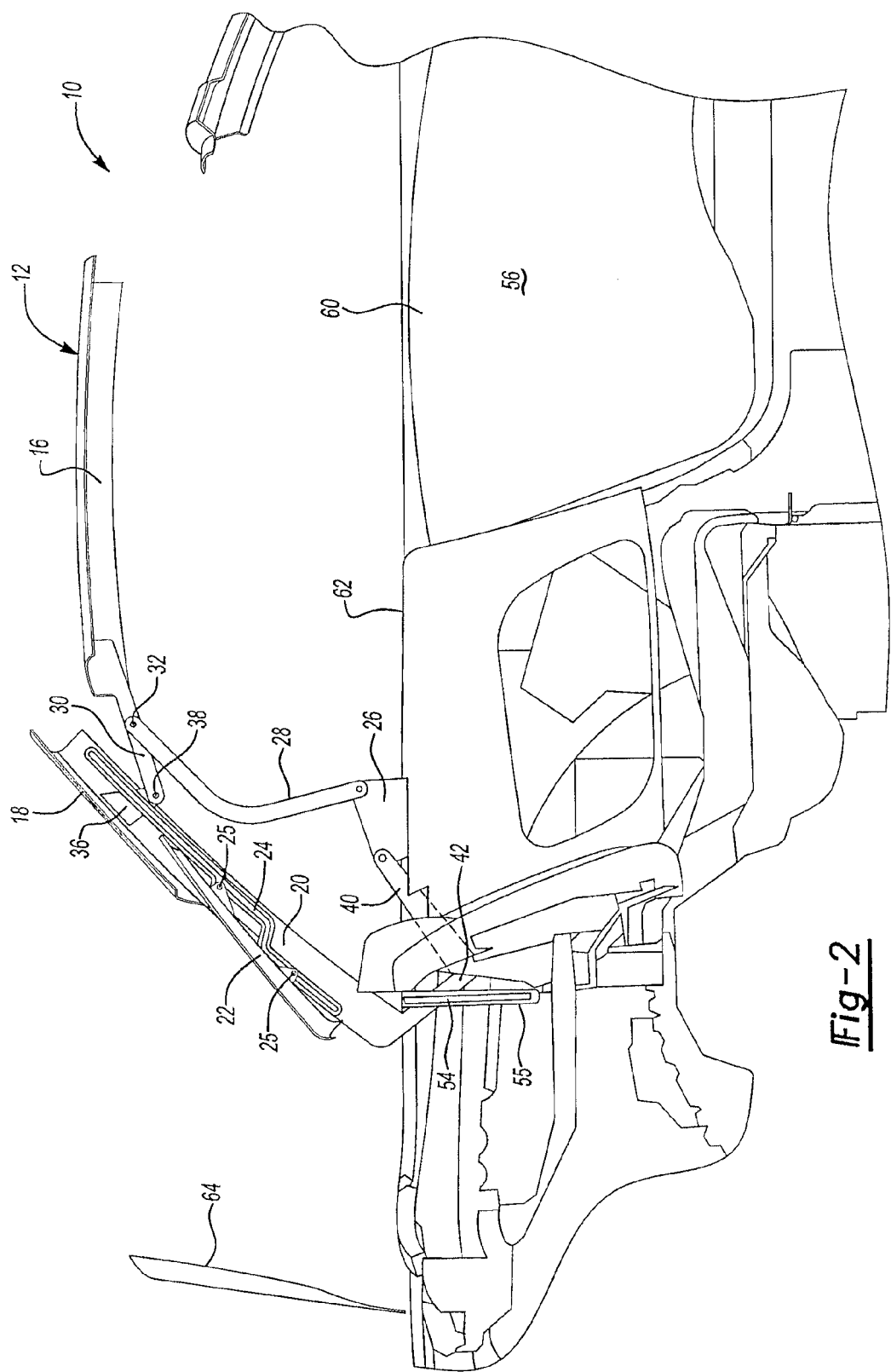
FIG. 2 is a fragmentary diagrammatic side elevation view in the initial retraction position taken from the inside of the vehicle of one side of the retractable hardtop made according to the present invention in an early retraction position.
Figure 3:
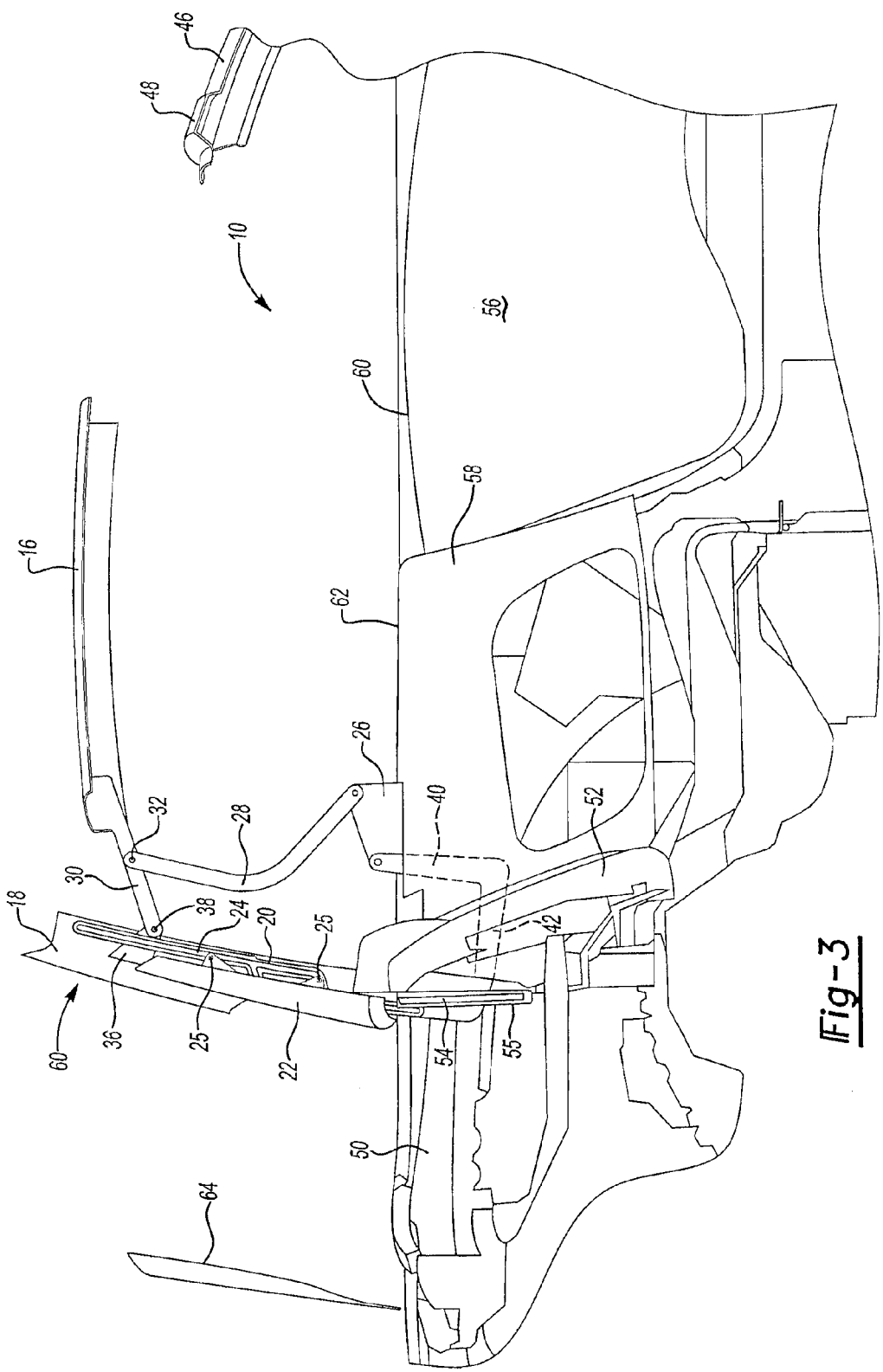
FIG. 3 is a fragmentary diagrammatic side elevation view in the mid-retraction position taken from the inside of the vehicle of one side of the retractable hardtop made according to the present invention in a mid-retraction position.

The procedure for retracting the retractable hardtop 12 is described further with reference to FIGS. 2 and 3. In FIG. 2, the retractable hardtop 12 is shown in an early phase of the retraction cycle. The balance link 28 raises the front panel 16 and moves the front panel 16 rearwardly away from the header 48. The rear extension link 30 raises the intermediate panel 18 and is tilted to approximately a 45° angle. A stacker for stacking the rear panel and intermediate panel in overlapping positions as shown in FIGS. 2-4 is provided. The back panel 22 slides within the guide track 24 with the leading edge of the back panel 22 being guided through the guide track 24 to a position below and toward the front of the intermediate panel 18. The rear extension link portion 40 is rotated in a counter-clockwise direction as shown in FIG. 2. The vertical extension leg portion 42 is tilted with the slide guide rail 20 and moves with the rear extension link portion 40.

Referring to FIG. 3, the retractable hardtop 12 is shown in a mid-retraction position. In this position, the front panel 16 is moved to a position generally over the rear seat portion of the passenger compartment 56 by the continued counter-clockwise rotation of the balance link 28. In this position, the guide track 24 is nearly vertical extending upwardly above the belt line 62. The rear extension link 40 is rotated to a downwardly extending position and the vertical extension leg portion 42 is in a nearly horizontal position within the sidewall 58 of the vehicle 10. The back panel 22 is moved to a position toward the front of the intermediate panel 18 and is guided through the guide track 24.

Referring to FIG. 4, the retractable hardtop 12 is shown in its fully refracted position and is disposed above the rear seat 52. The guide track 24 has been rotated to an inverted position with the back panel 22 disposed above the intermediate panel 18. The back panel 22 has advanced to the opposite end of the guide track 24 and the slide guide rail 20 as compared to the position shown in FIG. 1. The balance link 28, rear extension link 40 and vertical extension leg portion 42 have been rotated through the clearance slot in the sidewall 58. In this position, only the intermediate panel 18 and back panel 22 need be stored in the storage compartment 50 while the front panel 16 is stored over the rear seat. This converts the vehicle into an open top, two seat roadster configuration.

The extension cycle taking the retractable hardtop 12 from the stored position shown in FIG. 4 back to the extended position shown in FIG. 1, merely requires reversing the movement of the panels and links as described above.

While the operation of the retractable hardtop 12 has been described with reference to the linkage provided on the left side of the vehicle, it should be understood that a mirror image linkage is provided on the right side of the vehicle.

The illustrated embodiment provides a convertible top assembly for a vehicle body having a passenger compartment with front and rear seating areas covered by the top in its closed position in which a front panel is engageable with a windshield header in the closed position, an intermediate panel has a guide rail and a front edge conforming with a rear edge of said forward panel in the closed position, and a rear panel having a front edge conforming with a rear edge of said intermediate panel in the closed position. A drive reversibly retracts the roof from the closed position to an open or refracted position. An operator displaces said forward panel rearwardly and downwardly over the rear seating area of the compartment preferably near a belt line. A stacker stacks the rear panel with respect to the intermediate panel as the rear panel slides along the guide rail to a position below and toward the front of said intermediate panel. A linkage displaces the stacking panels rearwardly of said rear seating area at the open position.

The vehicle body may be provided with a storage compartment, preferably below a beltline, and the linkage preferably lowers the stacked panels in said compartment. The top may be combined with a rear window, and a window operator raises or lowers the window independently of the drive in both open and closed positions of the top. The rear panel includes an edge conforming with a top edge of the window in the closed position of said top. The rear panel edge may also conform with peripheral portions of said window above a beltline.

As shown in the drawing figures, the operator comprises a flange 36 carried by the intermediate panel. An extension link 30 on the front panel 16 is pivotally secured to the flange 36 by a first pivot 38. A balance link 23 is pivotally secured to the extension link 30 at a position 32 spaced from the first pivot 33. The stacker comprises a guide track 24 carried by the intermediate panel 18, and the rear panel 22 has a follower received in said guide track. When the vehicle body has a storage compartment rearwardly of the passenger compartment, the linkage displaces the stacking panels to the storage compartment.

A method embodiment reversibly retracts a three-piece roof panel covering a passenger compartment with a front seating area and a rear seating area, to an open position. The three panels include a front panel engageable with a windshield header, an intermediate panel having a front edge conforming to a rear edge of the front panel, and a rear panel having a front edge conforming to a rear edge of the intermediate panel in the closed position. The method embodiment includes displacing the front panel rearwardly and downwardly over the rear seating area near a beltline, stacking the rear panel with respect to the intermediate panel to a relative position below and toward the front of intermediate panel as shown in FIGS. 3-4.

Displacing the stacking panels rearwardly of the rear seating area, preferably lowers the stacked panels by pivoting into the compartment below the beltline rearwardly of the seating compartment as shown in FIG. 4. The storage compartment rearwardly of the seating compartment may be enclosed by pivoting a cover 64 over the compartment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top assembly for a vehicle body having a passenger compartment with front and rear seating areas covered by the top in its closed position, comprising:
   a front panel, engageable with a windshield header in the closed position;
   an intermediate panel having a guide rail and a front edge conforming with a rear edge of said front panel in the closed position;
   a rear panel having a front edge conforming with a rear edge of said intermediate panel in the closed position;
   a drive for reversibly retracting said roof from the closed position to an open position having an operator for displacing said front panel rearwardly and downwardly over the rear seating area of the compartment near a belt line;
   a stacker for stacking said rear panel with respect to said intermediate panel along said guide rail to a position below and toward the front of said intermediate panel; and
   a linkage displacing the rear and intermediate panels rearwardly of said rear seating area at the open position.

2. The invention as claimed in claim 1, wherein said vehicle body has a storage compartment below a beltline and said linkage lowers said rear and intermediate panels in said compartment.

3. The invention as claimed in claim 1, wherein said top includes a rear window, and a window operator raising or lowering said window independently of said drive in both open and closed positions of the top.

4. The invention as claimed in claim 3, wherein said rear panel includes an edge conforming with a top edge of said window in the closed position of said top.

5. The invention as claimed in claim 4, wherein said rear panel edge conforms with peripheral portions of said window above a beltline.

6. The invention as claimed in claim 1, wherein said operator comprises a flange carried by said intermediate panel and an extension link on said front panel pivotally secured to said flange by a first pivot, and a balance link pivotally secured to said extension link at a position spaced from said first pivot.

7. The invention as claimed in claim 1, wherein said stacker comprises a guide track carried by said intermediate panel, and said rear panel has a follower received in said guide track.

8. The invention as claimed in claim 1, wherein said vehicle body has a storage compartment rearwardly of said passenger compartment and wherein said linkage displaces said stacking panels to said storage compartment.

9. A method for reversibly retracting a three-piece roof panel having a front panel engageable with a windshield header, an intermediate panel having a front edge conforming to a rear edge of the front panel, and a rear panel having a front edge conforming to a rear edge of the intermediate panel in the closed position covering a passenger compartment with a front seating area and a rear seating area, to an open position, the method comprising:
  displacing said front panel rearwardly and downwardly over the rear seating area near a beltline;
  stacking said rear panel with respect to said intermediate panel to a relative position below and toward the front of said intermediate panel; and
  displacing said rear and intermediate panels rearwardly of the rear seating area.

10. The invention as claimed in claim 9, wherein said displacing said rear and intermediate panels step includes lowering said panels below a beltline.

11. The invention as claimed in claim 10, wherein said lowering pivots said panel rearwardly of the seating compartment.

12. A convertible top assembly for a vehicle body having a passenger compartment with front and rear seating areas covered by the top in its closed position, comprising:
  a front panel, engageable with a windshield header in the closed position;
  an intermediate panel having a guide rail and a front edge conforming with a rear edge of said front panel in the closed position;
  a rear panel having a front edge conforming with a rear edge of said intermediate panel in the closed position;
  a drive for reversibly retracting said front panel, said intermediate panel and said rear panel from the closed position to an open position;
  wherein said front panel is displaced rearwardly and downwardly over the rear seating area of the compartment near a belt line, said rear panel is stacked with respect to the intermediate panel as the rear panel is shifted along said guide rail to a stacked position below and toward the front of said intermediate panel, and displacing said stacked panels rearwardly of said rear seating area at the open position.

13. The invention as claimed in claim 12, wherein said vehicle body has a storage compartment below said beltline and said stacked panels are displaced to said storage compartment.

14. The invention as claimed in claim 12, wherein said top includes a rear window, and a window operator raising or lowering said window independently of retracting said front panel, said intermediate panel and said rear panel in both open and closed positions of the top.

15. The invention as claimed in claim 14, wherein said rear panel includes an edge conforming with a top edge of said window in the closed position of said top.

16. The invention as claimed in claim 9, wherein said stacking step comprises guiding said rear panel along a guide rail.

17. The invention as claimed in claim 16, wherein the guide is integrated with the intermediate panel.

* * * * *